April 9, 1946.    B. SARAFIN    2,398,043
SPRING RETAINED CLOSURE PLUG
Filed Sept. 7, 1944
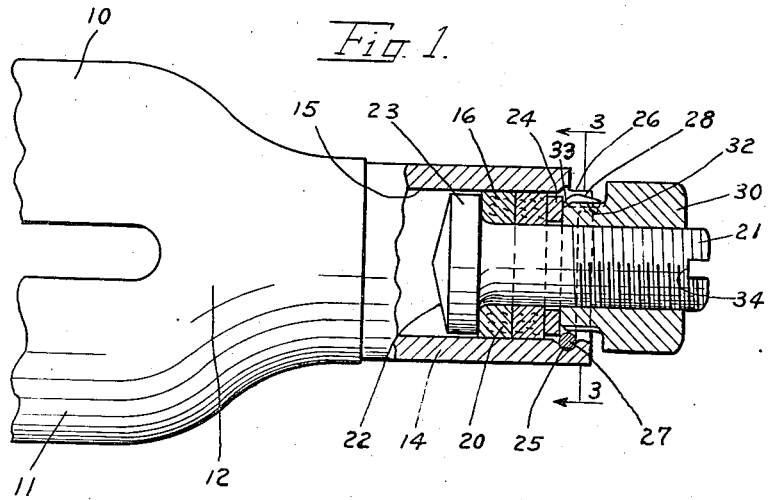
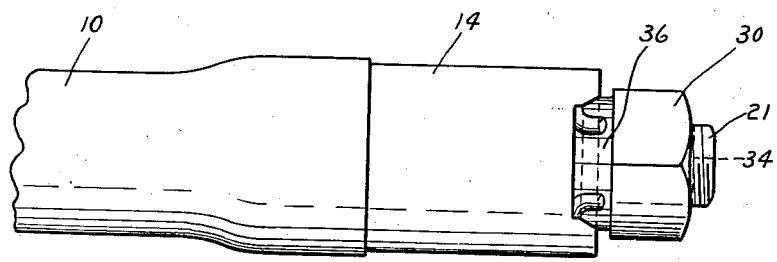
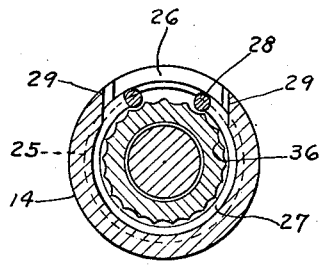
BORIS SARAFIN
INVENTOR.
BY Patented Apr. 9, 1946

2,398,043

UNITED STATES PATENT OFFICE 2,398,043

SPRING RETAINED CLOSURE PLUG

Boris Sarafin, Gary, Ind., assignor to The Superheater Company, New York, N. Y.

Application September 7, 1944, Serial No. 553,049

5 Claims. (Cl. 138—95)

The present invention relates to improvements in removable closures for fluid circulating elements such as economizer tubes.

In many types of fluid circulating tubes, such as the tubes of economizers in boiler installations, it is desirable to have access to the interior of the tubes for cleaning them periodically. Various types of removable closures have been provided for this purpose and the present invention relates to a cleanout closure of simple construction in which the closure elements and the parts that maintain it in place within a tube are removable as a unit so that they may be kept together to avoid loss and to assure ready replacement.

In the accompanying drawing:

Figure 1 is a longitudinal sectional view through a fluid circulating element equipped with a removable cleanout closure embodying the present invention;

Figure 2 is a plan view corresponding to Fig. 1; and

Figure 3 is a sectional view on the line 3—3 in Figure 1.

In Figure 1 the tubes 10 and 11 may be considered to represent two parallel pipes of an economizer or the like that are serially connected at one end by an integrally formed breeches piece 12. The annular body portion 14 at the end of the breeches piece has a bore 15 extending to its outer end in which a cleanout plug or closure designated as a whole by the numeral 16 is located. The closure member 16 comprises pressure deformable sealing means 20 mounted on the stem 21 of a carrier 22 between the head 23 of the latter and washer-like plug member 24 through which the stem 21 extends.

Near the outer end of the annular body portion 14 the inner wall of its bore 15 is formed with a circumferentially extending groove 25. The wall of the body portion 14 is also cut away at the outer end thereof to provide a notch 26 so located that it communicates at either end with the circumferential groove 25. A stiff but resilient snap ring 27 is adapted to be mounted in the circumferential groove 25 in contact with the plug member 24 so as to hold the latter against axial displacement in an outward direction. The snap ring 27 is an incomplete circle in form and has laterally bent end portions 28 which when the ring is mounted in place are positioned in the slot 26 so that they may engage the end walls 29 thereof to limit rotation of the snap ring 27 and parts associated therewith. The outer end of the stem 21 of carrier 22 is threaded to receive a nut 30 which has a neck portion 32 of smaller dimension than the internal diameter of ring 27 and the distal end of the neck is beveled at 33 to facilitate its passage into the ring 27. When the carrier 22 is held against rotation by holding a screw driver or other tool in the slot 34 at the outer end of the stem 21 thereof the nut 30 may be turned up to draw the head 23 of the carrier 22 axially outward to deform the sealing means 20 into pressure-tight relation with the interior wall of the bore 15. The outwardly turned ends 28 of the snap ring 27 frictionally engage the neck 32 on nut 30 and thereby limit rotation thereon. The neck 32 may be provided with flutes 36 as appears in Fig. 4 to prevent such rotation.

It should be noted that in addition to retracting the carrier 22 so as to compress the sealing means 20, the nut 30 also assures that the ring 27 is maintained in place because its neck 32 fits within the ring. The retaining ring 27 in addition to holding the plug member 24 against outward movement also prevents improper turning of the nut 30 either by frictional engagement of its prongs 28 with the neck 32 of the nut or by seating in the flutes 36 formed on the latter.

Unnecessary wear and tear on the sealing material 20 incidental to mounting and removal of the closure member is avoided because of the elimination of lugs or projections on the inner wall of the bore such as have been used to form bayonet locks for limiting axial movement of the closure plug in other constructions.

What I claim is:

1. A removable closure for a fluid circulating element provided with an annular body portion, said closure having a carrier including a head disposed within the bore of said body portion and a stem projecting axially beyond the outer end of said body portion, deformable sealing means mounted on the stem of said carrier adjacent its head, and a plug member mounted on said stem to cooperate with the head of said carrier for deforming said sealing means into pressure-tight relationship with the bore wall of said body portion; said annular body portion being cut away at its outer end to provide a circumferential notch extending into the bore of said body portion and the inner wall of said bore being formed near its outer end with a circumferential groove opening into said notch; screw threads formed on the outer end of said stem and a nut thereon operable to deform said sealing means; a neck portion on said nut of smaller diameter than the bore of said body portion, said neck portion being fluted axially thereof; a retaining spring mounted on said neck portion and seated in said groove in engagement with the outer end of said plug member to lock it against axial movement in said bore; and outwardly bent end portions on said spring disposed in said notch and lockingly engageable with the end walls thereof and seating in the flutes in said neck portion to limit turning of said nut on said stem.

2. A removable closure for a fluid circulating element provided with an annular body portion, said closure having a carrier including a head disposed within the bore of said body portion and a stem projecting axially beyond the outer end of said body portion, deformable sealing means mounted on said carrier adjacent its head, and a plug member mounted on said stem to cooperate with the head of said carrier for deforming said sealing means into pressure-tight relationship with the bore wall of said body portion; said annular body portion being cut away at its outer end to provide a circumferential notch extending into the bore of said body portion and the inner wall of said bore being formed near its outer end with a circumferential groove opening into said notch; screw threads formed on the outer end of said stem and a nut thereon operable for moving said carrier head outwardly to deform said sealing means; a neck portion on said nut of smaller diameter than the bore of said body portion; a retaining spring mounted on said neck portion and seated in said groove in engagement with the outer end of said plug member to lock it against axial movement in said bore; and outwardly bent end portions on said spring disposed in said notch and lockingly engageable with the end walls thereof and seating against said neck portion to limit turning of said nut on said stem.

3. A removable closure for a fluid circulating element provided with an annular body portion, said closure having a carrier including a head disposed within the bore of said body portion and a stem projecting axially beyond the outer end of said body portion, deformable sealing means mounted on said carrier adjacent its head, and a plug member mounted on said stem to cooperate with the head of said carrier for deforming said sealing means into pressure-tight relationship with the bore wall of said body portion; said annular body portion being cut away at its outer end to provide a circumferential notch extending into the bore of said body portion and the inner wall of said bore being formed near its outer end with a circumferential groove opening into said notch; screw threads formed on the outer end of said stem and a nut thereon operable to deform said sealing means; a retaining spring seated in said groove in engagement with the outer end of said plug member to lock it against axial movement in said bore; and outwardly bent end portions on said spring disposed in said notch and lockingly engageable with the end walls thereof and with said nut to limit turning thereof on said stem.

4. A removable closure for a fluid circulating element provided with an annular body portion, said closure having a carrier including a head disposed within said bore of said body portion and a stem projecting axially beyond the outer end of said body portion, deformable sealing means mounted on the stem of said carrier adjacent its head, and a plug member mounted on said stem cooperating with the head of said carrier to deform said sealing means into pressure-tight relationship with the bore wall of said body portion; said annular body portion being cut away at its outer end to provide a circumferential notch extending into the bore of said body portion and the inner wall of said bore being formed near its outer end with a circumferential groove opening into said notch; means associated with said carrier stem for moving said carrier head outwardly to deform said sealing means; a retaining spring seated in said groove in engagement with the outer end of said plug member to lock it against axial movement in said bore; and outwardly bent end portions on said spring disposed in said notch and engageable with the end walls thereof.

5. A removable closure for a fluid circulating element provided with an annular body portion, said closure having a carrier including a head disposed within the bore of said body portion and a stem projecting axially beyond the outer end of said body portion, deformable sealing means mounted on the stem of said carrier adjacent its head, and a plug member mounted on said stem to cooperate with the head of said carrier for deforming said sealing means into pressure-tight relationship with the bore wall of said body portion; the inner wall of said bore being formed with a circumferential groove near the outer end of said body portion; screw threads formed on the outer end of said carrier stem and a nut thereon operable for moving said carrier head outwardly to deform said sealing means; and a retaining spring seated in said groove in engagement with the outer end of said plug member to lock it against axial movement in said bore and engaging said nut to limit turning thereof on said stem.

BORIS SARAFIN.